United States Patent [19]
Cawrse

[11] 3,890,767
[45] June 24, 1975

[54] APPARATUS FOR APPLYING LIDS TO CONTAINERS

[76] Inventor: Richard S. Cawrse, 915 Beachside Ln., Huron, Ohio 44839

[22] Filed: Nov. 23, 1973

[21] Appl. No.: 418,608

[52] U.S. Cl. .................. 53/296; 53/307; 53/329
[51] Int. Cl. ............................................. B65b 7/28
[58] Field of Search ..................... 53/296–298, 53/303, 307, 309, 329

[56] References Cited
UNITED STATES PATENTS

| | | | |
|---|---|---|---|
| 2,928,222 | 3/1960 | Lindstaedt | 53/297 |
| 3,293,823 | 12/1966 | Anderson | 53/307 X |
| 3,354,605 | 11/1967 | Amberg et al. | 53/329 X |
| 3,509,682 | 5/1970 | Logemann | 53/307 X |
| 3,517,476 | 6/1970 | Bowen | 53/303 X |
| 3,657,862 | 4/1972 | Milne | 53/297 |
| 3,685,254 | 8/1972 | Currier et al. | 53/329 |
| 3,712,023 | 1/1973 | Bryan et al. | 53/307 |
| 3,849,972 | 11/1974 | Pepmeier et al. | 53/329 |

*Primary Examiner*—Robert L. Spruill
*Attorney, Agent, or Firm*—Donnelly, Maky, Renner & Otto

[57] ABSTRACT

Lids are held to a movable carrier by a vacuum during lid feeding movement of the carrier to a lidding position and are separated from the carrier at such lidding position for securement against the peripheral edges of container openings.

6 Claims, 10 Drawing Figures

PATENTED JUN 24 1975

3,890,767

SHEET 3

APPARATUS FOR APPLYING LIDS TO CONTAINERS

BACKGROUND OF THE INVENTION

Small containers are often closed by foil lids adhesively bonded to the peripheral edges of the container openings. The light weight and high flexibility of foil lids makes them very difficult to handle, particularly in high speed processing apparatus. Slight irregularities in the peripheral edges of the container openings make it difficult to obtain a good seal because the foil lids often span such irregularities without being securely bonded to the peripheral edge at the irregularity.

SUMMARY OF THE INVENTION

Flexible lid material in sheet form is held to a movable lid carrier by a vacuum during lid feeding movement of the carrier to a stopped lidding position. Fluid pressure means operates at the lidding position for separating lids from the carrier and forcing them against the peripheral edges of container openings. The fluid pressure means provides an air cushion which deforms the lids into firm engagement with any irregularities in the peripheral edges of the container openings.

In one arrangement, cutting means is provided for cutting the sheet material into individual lids during feeding movement of the carrier. The lid carrier undergoes sequential indexing movements including successive lid feeding movements interrupted by stopped lidding positions.

In a preferred arrangement, an indexable container conveyor indexes containers past the lid carrier, and container lifting means lifts containers from the conveyor toward the lid carrier in the stopped lidding positions thereof.

In accordance with a preferred arrangement, the lid carrier comprises a rotatable mandrel having a polygonal cross-sectional configuration including an outer surface formed by a plurality of substantially plane surfaces of equal area. A vacuum is applied through the mandrel for holding lids against the plane surfaces during rotational lid feeding movement of the mandrel, and fluid pressure is supplied through the mandrel to one of the plane surfaces located at the lidding position for separating the lids from the mandrel and forcing them against the peripheral edges of the container openings.

The lid material includes a thermoplastic adhesive and the mandrel is heated for softening the adhesive so that the lids will be securely bonded to the peripheral edges of container openings when forced from the mandrel by the fluid pressure means. The heat also sterilizes the lid material.

It is a principal object of the present invention to provide an improved apparatus and method for applying lids to containers.

Another object of the invention is to provide an improved apparatus and method for securely bonding foil lids to containers even though the peripheral edges of the container openings may have slight irregularities.

An additional object of the invention is to provide an improved apparatus and method for applying lids to containers in an economical manner at a very high production rate.

A further object of the invention is to provide an improved container and lid wherein the lid has four graspable pull tabs for separating the lid from the container.

Other objects and advantages of the present invention will become apparent as the description proceeds when taken in connection with the accompanying drawings.

DESCRIPTION OF A PREFERRED EMBODIMENT

Figure 1:
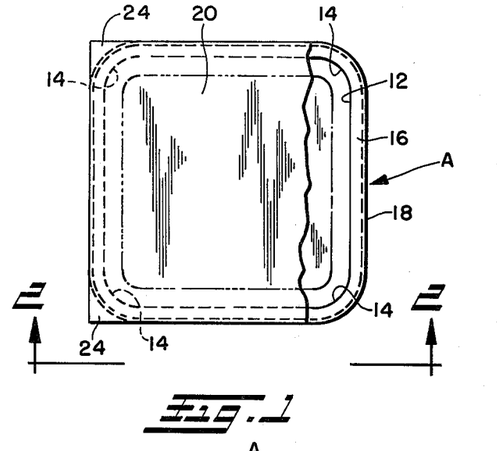
FIG. 1 is a top plan view of a container having a lid secured thereto, and with a portion of the lid cut away for clarity of illustration.
Figure 2:
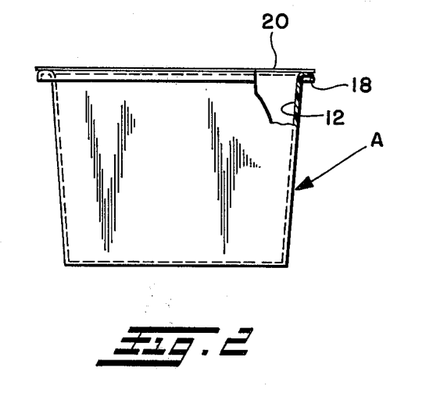
FIG. 2 is an elevational view looking generally in the direction of arrows 2—2 of FIG. 1, and with a portion of the container side wall in section to show the shape of its upper peripheral edge portion.

FIG. 1 shows a cup-like container A having a substantially square or rectangular top opening 12 including smoothly curved corners 14 and a top peripheral edge 16 defined by the upper surface of an outwardly extending integral flange 18. Container A may be formed of any suitable natural or synthetic material including paper, metal, or synthetic plastics. In a preferred form, container A is formed of suitable synthetic plastic material which is chosen in accordance with the type of material to be placed in container A and may include polyurethane, polyvinyl chloride or polystyrene. Upper peripheral edge 16 of opening 12 curves smoothly inward at corners 14 from the corners of a rectangle.

A square or rectangular foil lid 20 covers opening 12 and is bonded to peripheral edge 16. Lid 20 may be of any suitable material depending upon the material used for container A and the type of substance to be placed in container A. In a preferred form, lid 20 comprises aluminum foil, although it will be recognized that foil-like material of other metals or materials can also be used. The foil is highly flexible and may have a thickness ranging from 0.002 inch to 0.0005 inch, and these examples of thickness are only given to indicate the high flexibility of the lid material. Lid material having a greater or lesser thickness than the examples given can be used for certain applications, and particularly where such different material retains a high flexibility.

Any suitable adhesive may be used for bonding lid 20 to peripheral edge 16, and will depend upon the materials used for container A and lid 20. Where container A is formed of synthetic thermoplastic material of the type previously described, and lid 20 is formed of aluminum foil, a suitable thermoplastic adhesive such as polyvinyl acetate, polyvinyl alcohol, acrylic or polyamide is applied as a coating on the surface of lid 20 which engages peripheral edge 16. Lid 20 is heated for softening such adhesive prior to positioning of lid 20 on container A. The softened adhesive on lid 20 will then securely bond to peripheral edge 16.

As shown in FIG. 1, lid 20 is rectangular and of such a size to completely engage peripheral edge 16, and includes four sharp corners generally indicated at 24 which extend outwardly beyond peripheral edge 16 at corners 14. Such corners 24 actually define four pull tabs, any one of which is graspable between a person's thumb and finger for peeling lid 20 from container A. Pulling on any one of the four tabs in a peeling manner will release the adhesive bond between lid 20 and peripheral edge 16 for exposing the contents of container A.

Containers of the type described often have slight irregularities in peripheral edge 16 and lid 20 will not be securely bonded around the entire periphery of peripheral edge 16. This may result in leakage of the contents of container A or spoilage of the material. Small containers of the type described are commonly used for packaging food and a good seal is particularly desirable. The improved apparatus and method of the present invention insures a secure bond of lid 20 to entire peripheral edge 16 so leakage or spoilage of the container contents will not occur. Furthermore, this is achieved in a very economical and efficient manner.

Figure 3:
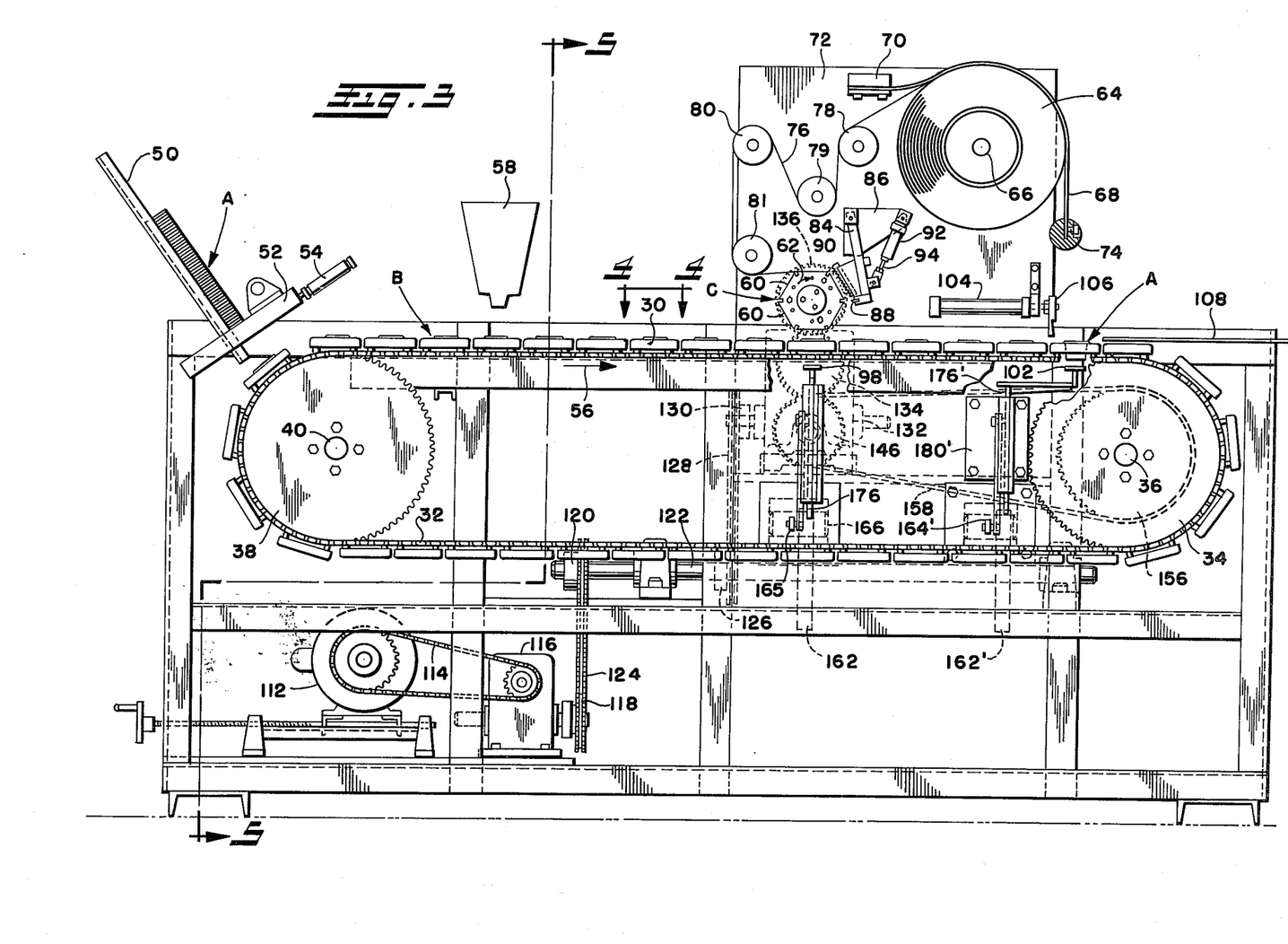
FIG. 3 is a side elevational view of an apparatus constructed in accordance with the present invention.

As shown in FIG. 3, a container conveyor B includes a plurality of individual conveyor links 30 secured to and spanning a pair of spaced-apart chains 32 which extend around a pair of transversely spaced-apart drive sprockets 34 mounted on rotatable shaft 36 and a pair of transversely spaced-apart idler sprockets 38 mounted on rotatable shaft 40.

Figure 4:
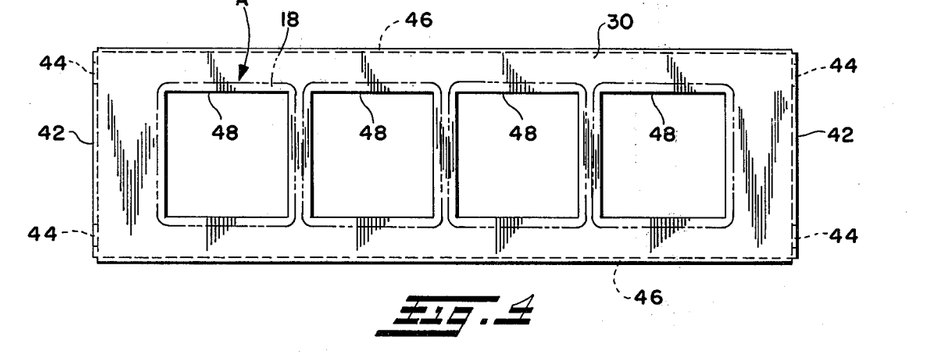
FIG. 4 is a top plan view of a conveyor link looking generally in the direction of arrows 4—4 of FIG. 3.

As shown in FIG. 4, each link 30 of conveyor B has a generally rectangular shape and includes downwardly extending opposite end flanges 42 having suitable holes 44 therethrough for receiving fasteners to connect the links to chains 32. Opposite side flanges 46 reinforce links 30 against bending. Each link 30 has a plurality of transversely spaced-apart rectangular openings 48 therein, four of which are shown in FIG. 4. It will be recognized that any desired number of rectangular openings may be provided depending upon the number of containers to be supported by each link 30. Openings 48 are dimensioned and shaped for receiving containers A with flange 18 thereof resting against the upper surface of link 30 around the periphery of each opening 48. The spacing between openings 48 is sufficient so that flanges 18 on adjacent containers will not overlap one another.

Referring back to FIG. 3, a container feed mechanism includes an inclined guide 50 for supporting a plurality of stacked and nested containers A with their bottoms facing generally downwardly. A stripper device 52 includes a stripper knife which is engageable between the flange of the lowermost container in the stack and the flange of the next higher container for stripping the lowermost container from the stack and depositing it within openings 48 in links 30. The stripper knife is reciprocatingly operated in timed relationship to indexing movement of conveyor B by a cylinder 54 in a known manner. The number of stacks of containers and the number of stripper knives or fingers will correspond with the number of container receiving openings in links 30.

As containers A are indexed in the direction of arrow 56 by indexing movement of conveyor B, they are filled with any desirable material from filling hopper device 58. The containers then travel toward a moveable lid carrier means in the form of a mandrel C having a polygonal cross-sectional configuration which includes a plurality of plane outer surfaces 60 of substantially equal size and shape. Mandrel C is rotatably indexed in the direction of arrow 62 in timed relationship to indexing movement of container conveyor B.

An elongated sheet of foil lid material coated with a heat softenable adhesive on one surface thereof is formed into a roll 64 and rotatably mounted on shaft 66. A flexible strap 68 of any suitable material is clamped at one end to a bracket 70 fixed to frame plate 72 and has a weight 74 suitably secured to its other end. Strap 68 hangs over roll 64 to provide a braking action for preventing overrunning of roll 64.

Foil lid material 76 extends around a plurality of idler rollers 78-81 in a tortuous path from roll 64 to engagement with the outer peripheral surface of mandrel C. Lowermost idler roller 81 is preferably located low enough so that foil lid material 76 must extend slightly upwardly therefrom into engagement with mandrel C. As mandrel C is rotatably indexed in the direction of arrow 62, a vacuum is applied to those surfaces 60 which face upwardly and to the right in FIG. 3. Fluid pressure is supplied to that surface 60 which faces downwardly toward containers A. Each successive plane surface 60 faces downwardly toward containers A in successive links 30 and defines a lidding position. The vacuum is the sole means retaining foil lid material 76 against mandrel C during lid feeding movement thereof.

As mandrel C is rotatably indexed, a cutting device successively operates in the stopped positions of mandrel C for cutting foil lid material 76 into rectangular foil lids 20. In one arrangement, the cutting device includes an arm 84 pivotally connected to a bracket 86 secured to frame plate 72. A longitudinal cutting knive 88 and a plurality of transverse cutting knives 90 are suitably secured to arm 84. Longitudinal knife 88 has a sufficient length for cutting completely across foil sheet 76. Three transverse knives 90 are longitudinally spaced-apart for cutting foil sheet 76 longitudinally of its length. A cylinder 92 is pivotally secured to bracket 86 and has its rod 94 pivotally connected with arm 84. Cylinder 94 is energized in timed relationship so that it moves toward mandrel C in the stopped positions thereof to cut foil sheet 76. Cylinder 92 is then operated for moving the knives away from mandrel C during lid feeding rotational movement thereof. Knives 88 and 90 are preferably of the serrated type and have teeth similar to a fine hacksaw blade so that foil lid material 76 is pierced and cut without tearing.

Mandrel C is also heated for sterilizing foil lid material 76 and softening the adhesive coating thereon. Obviously, the adhesive coating on foil sheet 76 is on that surface facing outwardly when the foil sheet is in engagement with mandrel C.

When conveyor B and mandrel C are in stopped positions, one conveyor link 30 is directly aligned beneath the downwardly facing plane surface 60, and container lifting plates 98 move upwardly into engagement with the bottoms of containers A for lifting them upwardly toward the downwardly facing plane surface 60. When upper peripheral edges 16 of containers A contact the lids held to the downwardly facing plane surface, fluid pressure is supplied to that downwardly facing surface on mandrel C for separating the lids from the downwardly facing plane surface thereof and forcing them against peripheral edges 16 of containers A. This fluid pressure provides a fluid cushion acting across lids 20 for deforming them into secure engagement with peripheral edges 16 so that lids 20 will be in secure engagement with edges 16 even though there are slight irregularities therein. The fluid cushion also slightly cools the lid material and speeds setting of the adhesive so that the lids will be securely bonded around the entire periphery of edges 16. Plates 98 then move downwardly out of contact with containers A. Mandrel C and conveyor B are successively indexed for repeating this operation to successively apply lids to containers A.

Another lifting device located adjacent drive sprockets 34 includes lifting plates 102 which moves upwardly in the stopped positions of conveyor B for lifting containers A completely above links 30 whereupon a pusher cylinder 104 is operated for moving pusher plate 106 which pushes containers A from lifting plates 102 onto discharge table 108. Lifter plates 102 on the discharge lifting device move upwardly much higher than lifter plates 98 at the lidding station.

The described apparatus may be driven in any desirable manner and in one arrangement includes a drive motor 112 drivingly connected by a chain 114 with a gear reducer 116 having an output sprocket 118 drivingly connected with sprocket 120 on rotatable timing shaft 122 by a timing chain 124. Sprocket 126 on timing shaft 122 is connected by timing chain 128 with an input drive sprocket 130 on a Ferguson indexer 132 having an input pinion gear 134. Indexer 132 is constructed so that a 180° rotation of input drive pinion 130 rotates output pinion 134 60°, while the next 180° of rotation of input drive pinion 130 simply allows output pinion 134 to idle in a stopped position. This construction is for a mandrel C having six plane surfaces 60. Every other 180° of rotation of input drive pinion 130 also rotates output pinion 134 to rotate mandrel C for bringing successive plane surfaces 60 to the downwardly facing lidding position. Alternate 180° rotations of input drive pinion 130 simply allows output pinion 134 to idle in a stopped position so that mandrel C also stops with successive plane surfaces 60 facing downwardly at the lidding position.

Figure 5:
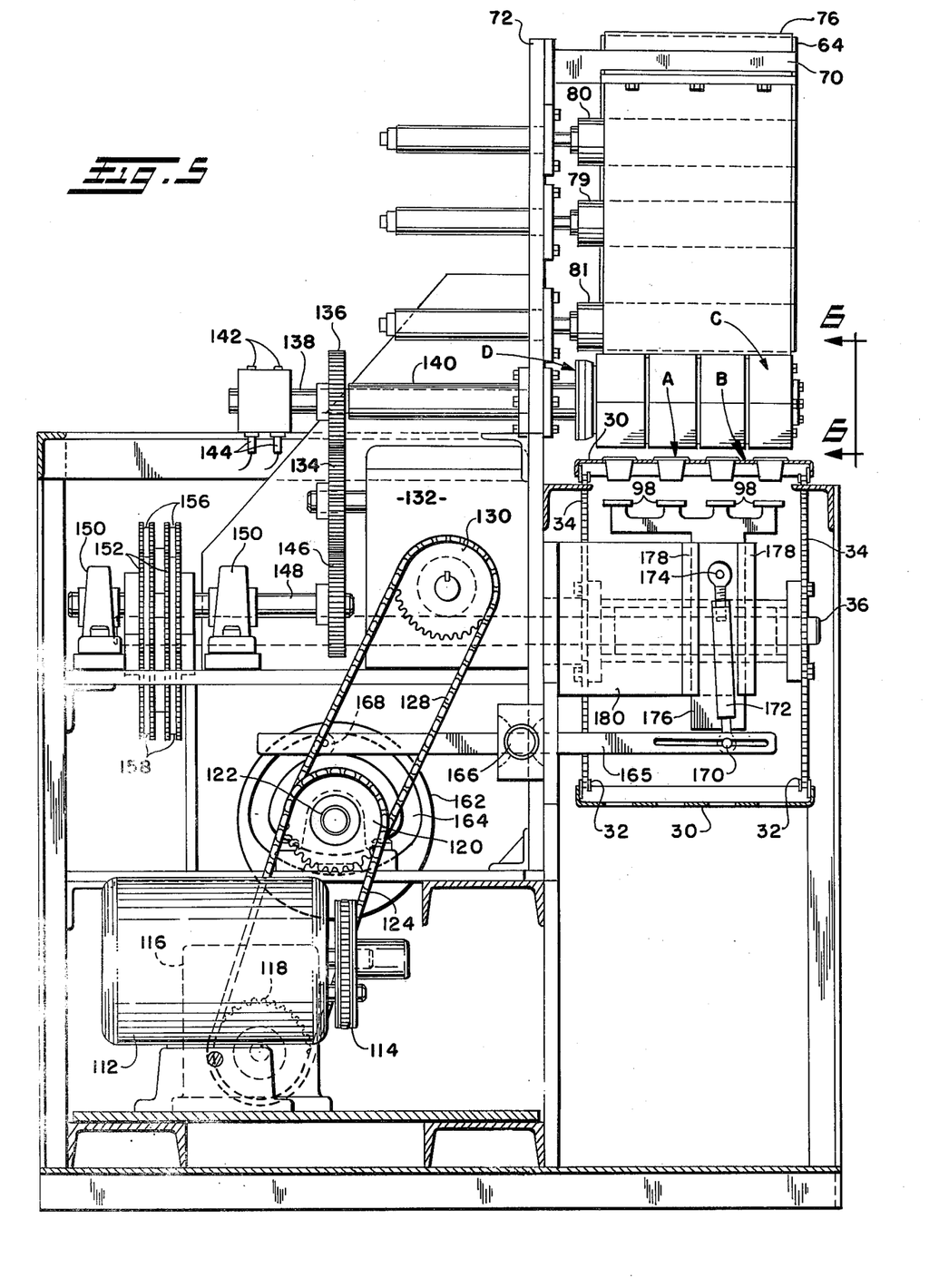
FIG. 5 is a cross-sectional elevational view looking generally in the direction of arrows 5—5 of FIG. 3, and with portions cut away for clarity of illustration.

As best shown in FIG. 5, output drive pinion 134 from indexer 132 drivingly engages mandrel pinion 136 secured to hollow mandrel shaft 138 rotatably journaled in bearing sleeve 140 secured to frame plate 72. Hollow shaft 138 also has slip rings 142 thereon cooperating with brushes 144 for supplying electrical current to a cartridge heater positioned within mandrel C through wires extending through hollow shaft 138 between slip rings 142 and the cartridge heater. Output drive pinion 134 also engages conveyor pinion 146 secured to shaft 148 rotatably journaled in suitable bearings 150. Shaft 148 has sprockets 152 thereon drivingly connected with conveyor drive sprockets 156 in FIG. 3 by a timing chain 158. Conveyor drive sprockets 156 are secured to shaft 36 for indexing conveyor chain sprockets 34. The gear ratio between output pinion 134, conveyor drive pinion 146 and conveyor drive sprocket 156 is such that successive links 30 on container conveyor B are indexed step-by-step beneath the downwardly facing plane surface 60 on mandrel C simultaneously with lid feeding rotational movement of mandrel C to bring a next successive plane surface 60 to the downwardly facing lidding position.

The lifting mechanism for raising cups A upwardly from links 30 on conveyor B toward mandrel C is best shown in FIG. 5. A cam 162 having a programmed trace 164 is secured to rotatable timing shaft 122. An elongated link 165 is pivotally connected to frame plate 72 at 166 and includes a cam follower roller 168 received in cam trace 164. Link 165 is also pivotally connected at 170 with an adjustable rod 172 pivotally connected at 174 to a slide member 176 slidably received for vertical reciprocating movement in gibbing 178 attached to support plate 180 secured to frame plate 72. Cam trace 164 is arranged so that connection 170 between link 164 and rods 172 is in its lowermost position during the 180° rotation of shaft 122 which corresponds to rotation of indexer output pinion 134 for rotating mandrel C in a lid feeding rotational movement and indexing conveyor B in a container feeding movement. During the next 180° of rotation of shaft 122, which corresponds to the stopped idling position of output pinion 134 along with mandrel C and conveyor B, cam trace 164 cooperates with cam follower 168 for pivoting link 165 counterclockwise about pivot 166 to raise slide 176 upwardly so that lifting plates 98 engage the bottoms of containers A located in a link 30 directly beneath a downwardly facing plane surface 60 on mandrel C for lifting those containers upwardly until peripheral edges 16 thereon engage the lid material on the downwardly facing plane surface. Fluid pressure is then supplied to the downwardly facing plane surface for separating the lids therefrom and forcing them into engagement with the upper peripheral edges of the container openings. During the latter part of the second 180° of rotation of shaft 122, cam trace 164 again cooperates with cam follower 168 for pivoting link 65 clockwise to lower slide 176 for again depositing the containers on the conveyor. Indexer 132 will then rotatably drive mandrel C in a lid feeding movement to position a successive plane surface 60 downwardly at the lidding position and simultaneously shift conveyor B to bring a new link to the lidding position. This procedure continues successively for successively lidding a plurality of containers. If desired, a spring may be provided in connecting rod 172 for providing a lost motion between rod 172 and either pivot connection 170 or 174 so that lost motion will occur between one of those connections and the rod when the upper peripheral edges of the container openings engage the downwardly facing plane surface on mandrel C.

The discharge lifter shown in FIG. 3 having lifter plates 102 is constructed similarly to the lifter described with reference to FIG. 5 and like parts have been given like prime numerals. The only difference between the two lifting mechanisms is that cam 162' is larger so that lifting plates 102 move upwardly a substantially greater distance than lifting plates 98 in order that lifting plates 102 will be completely above links 30 in the uppermost position thereof. Lifter plates 102 move upwardly at the same time as lifter plates 98 and pusher cylinder 104 extends pusher plate 106 to eject containers from lifter plates 102 onto discharge table 108 when fluid pressure is supplied to the downwardly facing plane surface on mandrel C. Pusher cylinder 104 is then retracted and lifter plates 102 move downwardly to the position shown in FIG. 3 prior to output rotation of output pinion 134 for a next successive feeding movement of mandrel C and conveyor B.

Figure 6:
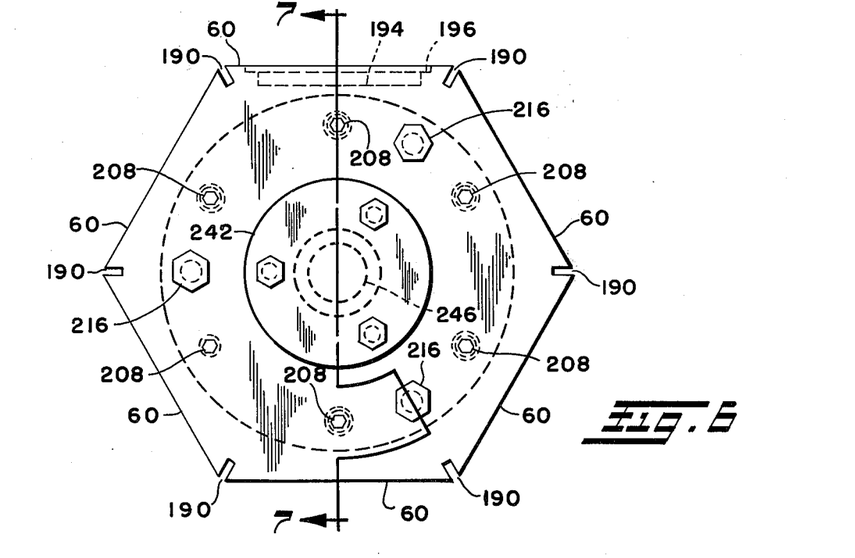
FIG. 6 is an end elevational view looking generally in the direction of arrows 6—6 of FIG. 5.
Figure 7:
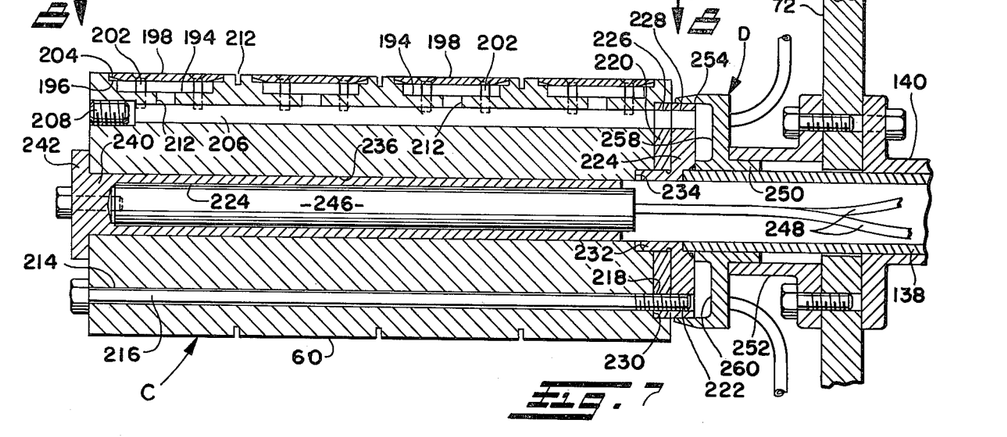
FIG. 7 is a cross-sectional elevational view looking generally in the direction of arrows 7—7 of FIG. 6.
Figure 8:
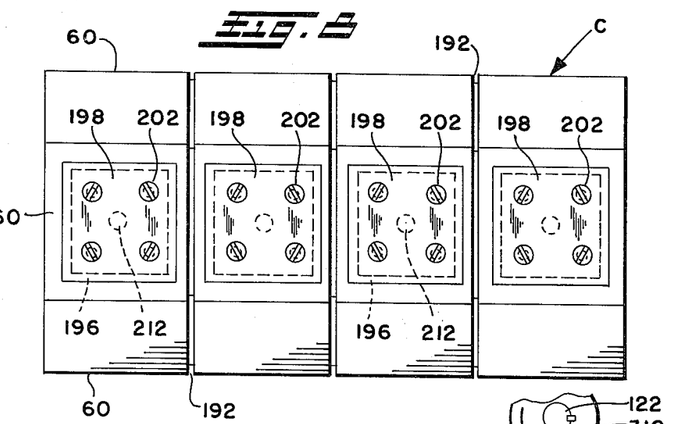
FIG. 8 is a plan view looking generally in the direction of arrows 8—8 of FIG. 7.

The construction of mandrel C is best shown in FIGS. 6–8. Mandrel C includes a plurality of longitudinal grooves 190 located at the intersections between plane surfaces 60. Longitudinally spaced-apart transverse grooves 192 extend perpendicular to grooves 190 across plane surfaces 60 and intersect grooves 190. In the arrangement shown, there are three transverse grooves 192 on each plane surface 60 because mandrel C is for simultaneously lidding four containers. Obviously, a greater or lesser number of such grooves will be provided depending upon the number of containers to be simultaneously lidded. Grooves 190 and 192 are so located in the stopped position of mandrel C that knives 88 and 90 are received therein during the forward cutting movement of the cutting knives for cutting foil sheet 76 into a plurality of individual rectangular lids 20.

Each plane surface 60 has four longitudinally spaced rectangular recesses 194 therein which are outwardly stepped to provide a circumferential shoulder 196. Generally rectangular plates 198 are positioned against shoulders 196 and have suitable holes therethrough for receiving screws 202 which extend into tapped holes in the bottom of recesses 194 for securing plates 198 against shoulders 196. Plates 198 preferably have a thickness such that the outer surfaces thereof are substantially flush with plane surfaces 60 on mandrel C when plates 198 are bottomed against shoulders 196.

Figure 9:
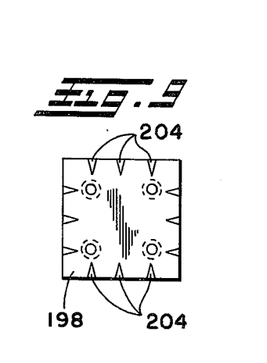
FIG. 9 is a bottom view of a plate used on the mandrel of FIGS. 7 and 8.

As best shown in FIG. 9, plates 198 have a plurality of spaced-apart inclined grooves 204 in the bottom outer surface thereof. Grooves 204 have a length and depth sufficient to establish fluid communication between recesses 194 and the atmosphere around the top peripheral edge of plates 198 when such plates are secured against shoulders 196.

Mandrel C has a plurality of circumferentially spaced longitudinal vacuum holes 206 therethrough, with one such hole being centrally located with respect to each plane outer surface 60. The outer ends of vacuum holes 206 are closed by plugs 208. Centrally located generally radially extending holes 212 establish communication between each recess 194 and a vacuum hole 206.

Mandrel C has a plurality of circumferentially spaced longitudinal assembly holes 214 therethrough for receiving assembly bolts 216 which extend through suitable holes 218 in a disc 220 of heat insulating material and thread into tapped holes 222 in an assembly plate 224. Disc 220 and assembly plate 224 also include holes 226 and 228 aligned with vacuum holes 206 in mandrel C. Disc 220 of heat insulating material is received in a circular end recess 230 in mandrel C and assembly plate 224 includes a central hub 232 having an end portion thereof received in a central mandrel bore 234 coincidental with centrally located mandrel hole 236.

Assembly plate 224 is welded or otherwise secured to hollow shaft 138 which is drivingly connected through pinions 134 and 136 with indexer 132 as shown in FIG. 5. A sleeve member 240 is snugly received in mandrel hole 236 and includes a flange 242 bolted to the outer end of mandrel C. Sleeve 240 includes central bore 244 snugly receiving an electrical cartridge heater 246 which is connected by wires 248 extending through hollow shaft 138 to slip rings 142. Heater 246 is preferably controlled by a thermocouple or other temperature sensing device for sensing the temperature of mandrel C and maintaining such temperature low enough to prevent combustion of the adhesive on the foil lid material or other heat damage to the lid material.

As shown in FIG. 7, a manifold member D includes a central hub 250 received over hollow shaft 138 and secured against movement to support 252 attached to frame plate 72. Hollow shaft 138, assembly plate 224, disc 220 and mandrel C are free to rotate relative to manifold D and support 252. Manifold D includes a circumferential flange 254 having a cylindrical inner surface positioned in close overlapping relationship to the cylindrical outer surface of assembly disc 224.

Figure 10:
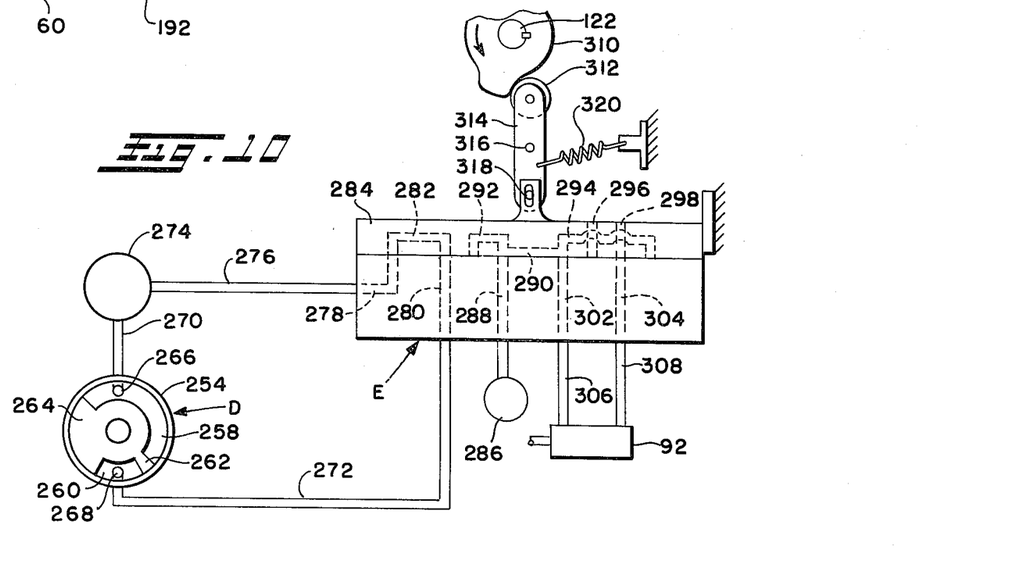
FIG. 10 is a diagrammatic illustration of a control arrangement used with the apparatus of FIG. 3.

As shown in FIG. 10, manifold D has a main vacuum cavity 258 separated from another cavity 260 by a web 262 having a thickness axially of manifold D which is the same as the thickness of main rear portion 264 of manifold D. In the assembled position of FIG. 7, the outer surfaces of web 262 and main rear portion 264 are positioned closely adjacent the right-hand surface of assembly disc 224, while the bottoms of cavities 258 and 260 are spaced substantially to the right or rearwardly from assembly disc 224.

Holes 266 and 268 in the bottoms of cavities 258 and 260 are connected with conduits 270 and 272. Conduit 270 communicates with vacuum pump 274 having another vacuum line 276 extending therefrom to a valve member E which is shown only diagrammatically for clarity of illustration and description. Valve E includes a passage 278 communicating with vacuum line 276 and with another passage 280 connected to conduit 270 through a passage 282 in valve slide 284. In the position shown, a vacuum is applied to both cavities 258 and 260 by vacuum pump 274. Therefore, the vacuum holes 206 which communicate with the uppermost and two right-hand plane surfaces 60 on mandrel C in FIG. 3 are always in communication with main vacuum cavity 258. Vacuum hole 206 communicating with the downwardly facing plane surface 60 of mandrel C in FIG. 3 is in communication with cavity 260. Atmospheric pressure acting against the outer surface of foil sheet 76 and the lids while a vacuum is applied to the other surfaces thereof facing mandrel C in the only force holding foil lid material 76 against mandrel C during rotational lid feeding movement thereof. This force is always acting to hold the lids or lid material against the uppermost and two rightmost plane surfaces of mandrel C in FIG. 3. This force acts selectively to hold lids against the downwardly facing plane surface of mandrel C through cavity 260.

An air pump 286 communicates with valve passage 288 which communicates with valve slide groove 290 and this in turn communicates with valve slide passages 292 and 294. Exhaust passages 296 and 298 are provided in valve slide 284. Valve passages 302 and 304 communicate with conduits 306 and 308 connected to double acting cylinder 92 which moves the cutting knives of FIG. 3.

During rotational lid feeding movement of mandrel C, a vacuum is applied to both cavities 258 and 260 for holding the lids and lid material against the plane surfaces on mandrel C. When mandrel C and container conveyor B stop at the lidding position, lifting plates 98 on the lifting mechanism raise containers A from link 30 positioned beneath the downwardly facing surface on mandrel C until the upper peripheral edges of the containers contact the lids held against the downwardly facing plane surface on the mandrel. Cam 310 on timing shaft 122 then acts against cam follower roller 312 on link 314 pivotally mounted at 316 and connected to valve slide 284 at 318 for shifting valve slide 284 to the left against the biasing force of spring 320. This disconnects passage 282 from communication with passage 280 while simultaneously establishing communication between passage 280 and 292. Air pressure from pump 286 then acts through conduit 272 and cavity 260 for supplying air pressure against the downwardly facing plane surface 60 of mandrel C for separating the lids therefrom and establishing an air cushion over such lids to force and deform them securely against the upper peripheral edges of containers A. The blast of air also slightly cools the lids to aid in setting of the adhesive as soon as the lids contact the upper peripheral edges of the containers. Simultaneously with leftward shifting movement of the valve slide 284, exhaust passage 296 moves into communication with passage 302 while passage 294 moves into communication with groove 290 and passage 304 for extending cylinder 92 to move the cutting knives toward mandrel C for cutting the sheet lid material into individual lids. After the lids have been separated from mandrel C and forced against the peripheral edges of containers A, the lifting device begins to move downwardly for again depositing the containers upon conveyor A. At any convenient period in this downward movement of the containers, cam follower 312 falls away from cam 310 so that valve slide 284 moves back to the right under the force of spring 320. This again establishes communication between vacuum pump 274 and cavity 260 so that a vacuum will be applied to the downwardly facing plane surface on mandrel C after the next indexing movement thereof. In addition, passage 304 is again ported to atmosphere through passage 298, while passage 302 again communicates with groove 290 for retracting cylinder 92 to pull the knife assembly away from the mandrel. Subsequent to this, and after the containers are again supported by the conveyor, timing shaft 122 will begin its second 180° of rotation so that indexer 132 will again operate for indexing mandrel C and conveyor B to bring the next plane surface 60 on mandrel C to the downwardly facing lidding position and bring a next successive link 30 of container conveyor B to that lidding position. The steps described above are again repeated and these steps go on repeatedly in succession for sequentially applying lids to cups. Pusher cylinder 104 and container feeding cylinder 54 are also connected for operation in timed relationship with cylinder 92 so that containers A are fed to succeeding links 30 when conveyor B is stopped and lidded containers are forced from lifting plates 102 onto discharge table 108 by pusher plate 106. It will be recognized by those skilled in the art that many different mechanical drives and hydraulic control arrangements may be provided for timing operation of the respective devices.

The arrangement described makes it possible to feed printed lid material without scratching or otherwise marring such printing. It is also possible to provide printing or a decorative pattern on plane surfaces 60 of mandrel C so that the air pressure acting on the outer surface of the lid material while a vacuum is applied to the other side will cause the lid material to be embossed with the pattern or printing. The arrangement for cutting the lid material on mandrel C automatically measures the length and width of each lid. Using air pressure at the lidding position also cleans all the air passages in mandrel C because they are successively subjected to a vacuum and then pressure.

For certain operations, it will be recognized that it is possible to omit fluid pressure at the lidding position and to use a different lid separating means or to simply release the vacuum for defining a spearating means. Lifting of the containers to engage the peripheral edges of the container openings against lids on the carrier will then cause the lids to bond to the containers and the lids will fall or be pulled away from the carrier when the containers are lowered. The fluid pressure separating feature which also helps to force the lids against the peripheral edges of the container openings can also be used with carriers having lid holding means other than a vacuum. The improved apparatus and method of the present invention can be used with lids of any desired shape, and can apply lids to any desired number of containers at the lidding position, including one or more.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. Apparatus for applying lids to the upper open ends of containers comprising conveyor means having indexing means to convey successive containers thereon horizontally in stepwise manner to a lidding position; a mandrel of polygonal cross-section at such lidding position disposed above said conveyor means; drive means for said mandrel operative to rotatably index said mandrel about a horizontal axis to horizontally position successive faces thereof above a container at such lidding position; means creating a vacuum on the mandrel face which is at lidding position and on at least the next two mandrel faces; means supporting a roll of lid material having heat sensitive adhesive material on one side thereof for rotation of said roll about an axis parallel to that of said mandrel for application of the leading end portion of said lid material onto at least the last one of the mandrel faces which have vacuum applied thereon with the other side of said lid material held by vacuum against said face whereby indexing of said mandrel will unwind said lid material from said roll to advance it to lidding position as the mandrel is successively indexed; knife means operative in response to indexing of said mandrel to cut the lid material at a vertex between such next faces; heating means in said mandrel effective to heat the lid material to activate said heat sensitive material on one side for adherence to the container at lidding position; elevator means operative to raise and lower a container at said lidding position to press the upper open end thereof against the heat activated side of the lid on the mandrel face which is then at lidding position, and to lower the container with the lid adhered thereto with respect to said mandrel; and valve means operative in response to elevation of said elevator means for applying air pressure on the mandrel face which is then at lidding position to aid in sealing the lid against the elevated container, to assist in separating the lid from said mandrel face when said elevator means and container thereon is lowered, and to provide a cooling effect on said lid to assist in deactivating said heat sensitive adhesive material.

2. The apparatus of claim 1 wherein said conveyor means and elevator means accommodates a plurality of containers in side by side relation and wherein additional knife means are provided to cut the lid material lengthwise thereof from said one vertex to the next vertex whereby, by the time that the successive mandrel faces reach lidding position, separate lids are provided at said lidding position for the plurality of containers at said lidding position.

3. The apparatus of claim 1 wherein said mandrel has an axial groove at each vertex cooperating with said knife means.

4. The apparatus of claim 2 wherein said mandrel has an axial groove at each vertex cooperating with said knife means; and wherein said mandrel faces have transverse grooves cooperating with said additional knife means.

5. The apparatus of claim 1 wherein said lids are cut to rectangular form with sharp corners; and wherein said containers have upper open ends of corresponding rectangular form except with rounded corners so that each lidded container has four pull tabs at the corners thereof to facilitate peeling of the lid therefrom for removal of the contents.

6. In a container lidding machine of the type having conveyor means operative to horizontally index in stepwise manner containers with open upper ends to a lidding position, and elevator means operative to lift a container at said lidding position against a lid having a heat softened bottom layer to adhere the lid to the open end of said container, the improvement which comprises means rotatably supporting a roll of lid material for unwinding of lid material therefrom; a heated mandrel of polygonal cross-section and indexing means therefor to rotatably index said mandrel to position successive plane faces thereof above successive containers at said lidding position; means creating a vacuum on the mandrel face which is in lidding position and on at least the next two successive faces for holding the leading end portion of the lid material on said faces thus to unwind lid material from said roll, to lineally advance it to lidding position and to heat said lid material to soften said bottom layer; knife means at a vertex between said next faces operative to sever the lid material thereat thus to provide a separate lid when the underlying mandrel face reaches lidding position; and valve means responsive to operation of said elevator means to lift a container at said lidding position against the lid thereabove to conduct air under pressure to act on the lid which then is in lidding position to enhance sealing of the lid against the upper open end of the lifted container, to assist in separation of the lid from the mandrel face upon lowering of the container by lowering of said elevator means, and to have a cooling effect on the heat softened layer of the lid to assist in solidification of such layer.

* * * * *